May 28, 1940.    G. E. BARNHART    2,201,976
HYDRAULIC SWIVEL CONNECTOR
Original Filed Jan. 10, 1938    3 Sheets-Sheet 2
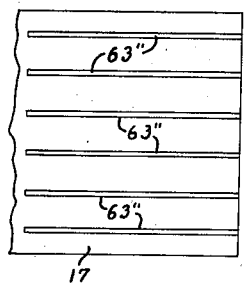
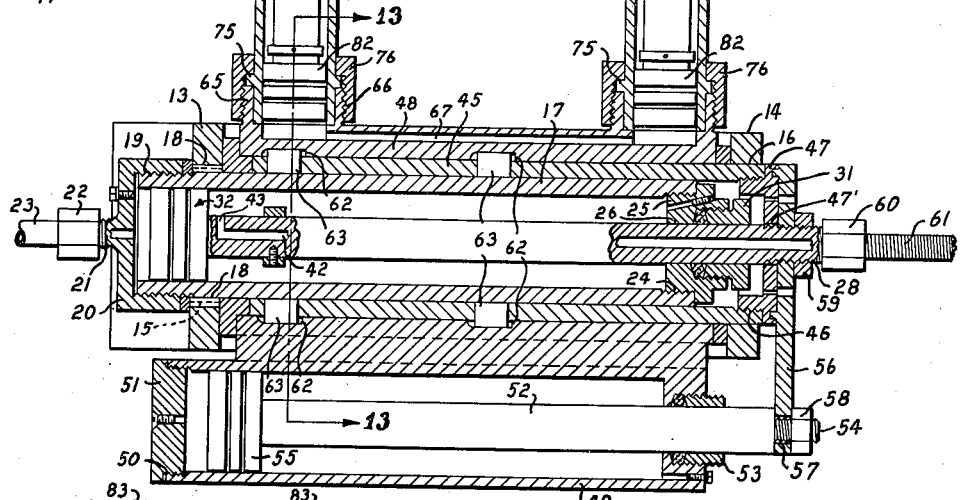
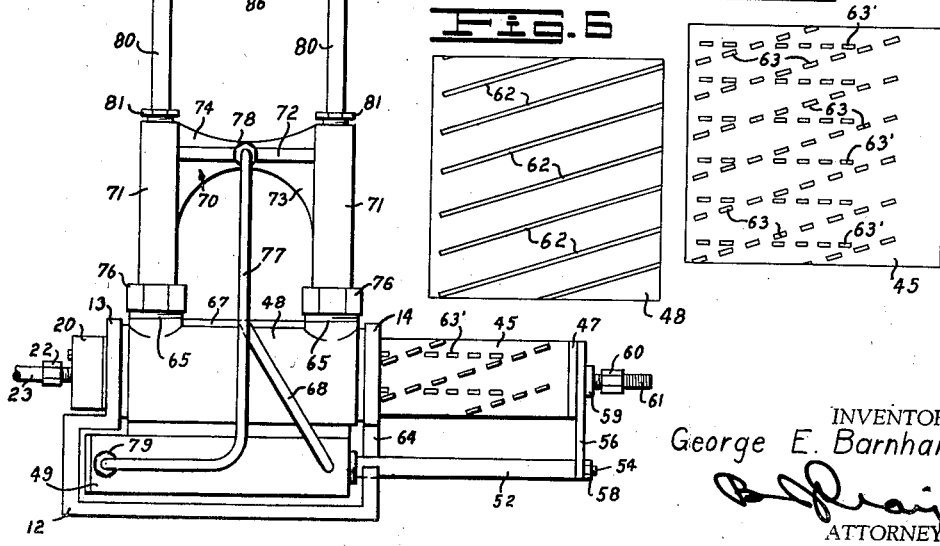
INVENTOR.
George E. Barnhart
ATTORNEY.

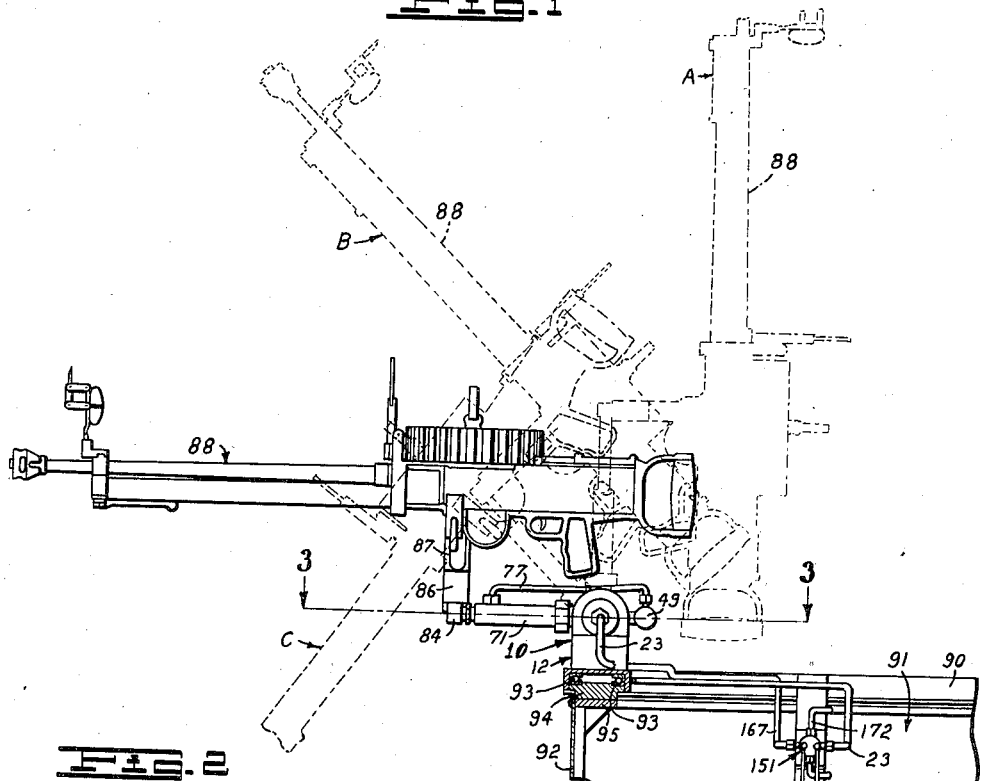
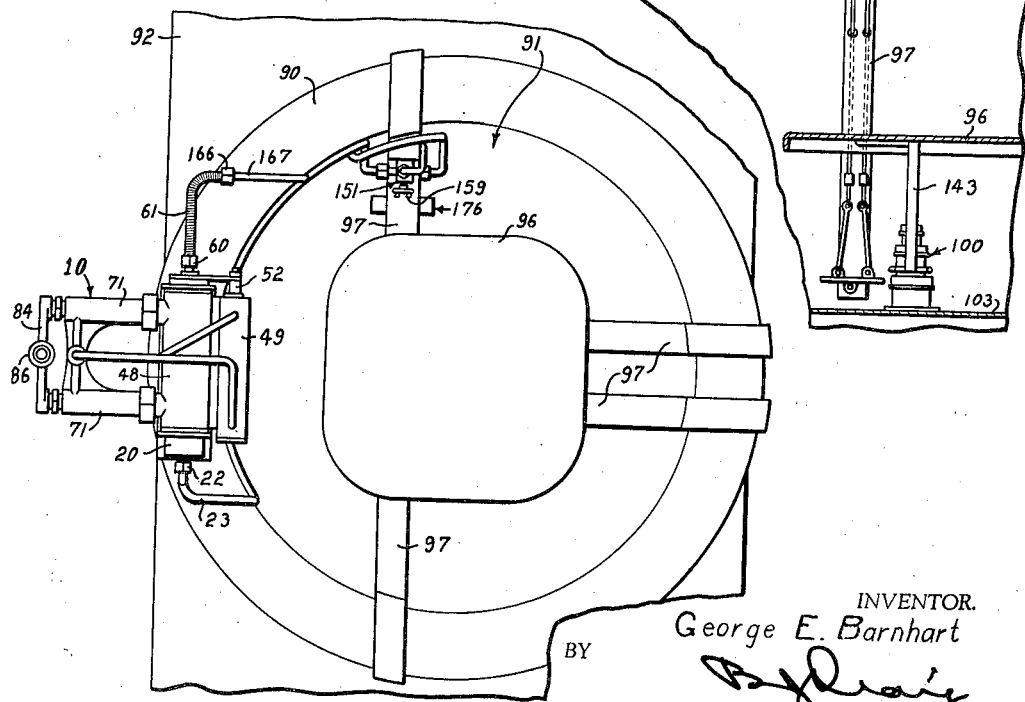

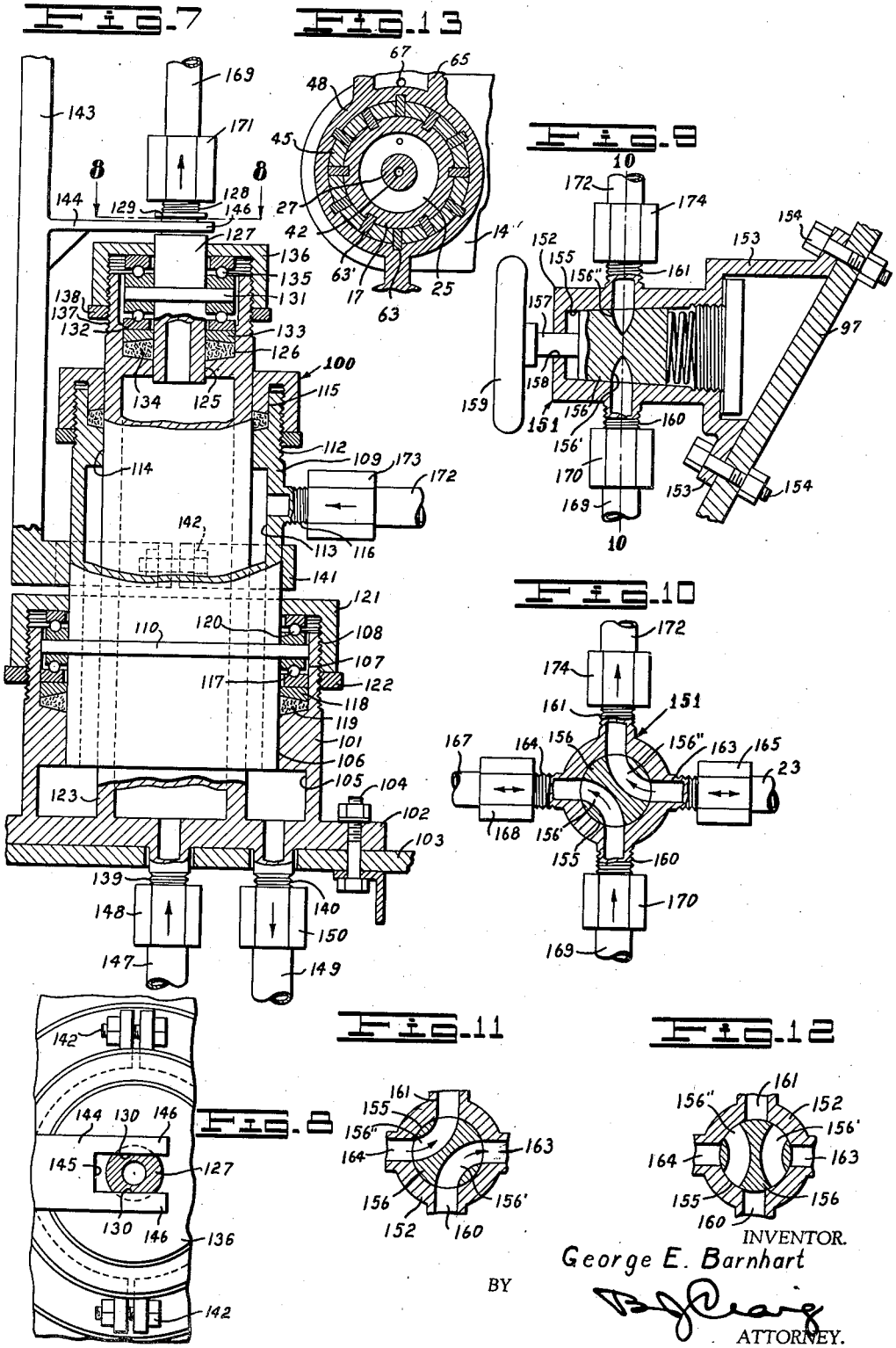

Patented May 28, 1940

2,201,976

UNITED STATES PATENT OFFICE 2,201,976

HYDRAULIC SWIVEL CONNECTOR

George E. Barnhart, Pasadena, Calif.

Original application January 10, 1938, Serial No. 184,232, now Patent No. 2,135,959, dated November 8, 1939. Divided and this application April 27, 1938, Serial No. 204,593

5 Claims. (Cl. 285—9)

This invention relates to swivel connectors.

The general object of this invention is to provide an improved hydraulic swivel connector.

Another object of the invention is to provide a swivel connector particularly adapted for use in mounting guns on airplanes.

A further object of the invention is to provide a swivel connector which includes novel means for connecting a plurality of fluid lines.

Other objects and the advantages of this invention will be apparent from the following description taken in connection with the accompanying drawings, wherein:

Fig. 1 is a fragmentary cross section through an airplane at the gunner's cockpit showing my swivel applied thereto;

Fig. 2 is a top plan view of the device shown in Fig. 1;

Fig. 3 is an enlarged section taken on line 3—3 of Fig. 1;

Fig. 4 is an enlarged rear view of the mount showing it rotated to a vertical position;

Fig. 5 is a reduced development of the sleeve member;

Fig. 6 is a reduced development of the interior of the housing member;

Fig. 6A is a reduced development of the outside of the master cylinder;

Fig. 7 is an enlarged vertical section through the fluid swivel member;

Fig. 8 is a fragmentary section taken on line 8—8 of Fig. 7;

Fig. 9 is an enlarged longitudinal section through the control valve;

Fig. 10 is a section taken on line 10—10 of Fig. 9;

Fig. 11 is a fragmentary section similar to Fig. 10;

Fig. 12 is a fragmentary section similar to Fig. 11 showing the plug valve in a closed position; and Fig. 13 is a fragmentary section taken on line 13—13 of Fig. 3.

This application is a division of my copending application, Serial No. 184,232 filed January 10, 1938, Patent No. 2,135,959, dated November 8, 1939.

Referring to the drawings by reference characters I have shown my improved swivel as used with a machine gun mount and control device which is indicated generally at 10. As shown the device 10 includes a base member 12 having spaced upwardly extending end flanges 13 and 14 thereon. The flange 13 has a cylindrical aperture 15 therein and the flange 14 has a similar coaxial aperture 16 therein of greater diameter than that of the aperture 15 (see Fig. 3).

Positioned in the aperture 15 I provide a cylinder member 17 which is secured to the flange 13 by a plurality of keys 18. The cylinder 17 projects beyond the flange 13 where it is externally threaded as at 19 to receive a threaded cap member 20 which closes that end of the cylinder. The cap member 20 includes a conduit portion 21 which is externally threaded to receive a coupling member 22 to secure thereto one end of a tube 23.

The end of the cylinder 17 opposite the cap 20 is internally threaded as at 24 to receive a threaded plug member 25 which has an aperture 26 therein.

Positioned in the aperture 26 I provide a piston rod 27 one end of which includes a reduced externally threaded portion 28. The plug member 25 includes a suitable packing gland member 31 surrounding the piston rod 27.

The piston rod within the cylinder 17 has a piston 32. The piston rod 27 has an axial bore 42 therein which opens at one end through the threaded end 28 and at the other end terminates short of the piston 32 where a lateral bore 43 communicates therewith and opens through the side of the piston rod.

Surrounding the cylinder 17 I provide a sleeve member 45 the end of which adjacent the flange 14 is internally threaded as at 46 to receive a threaded cap 47.

The cap 47 has a central aperture 47' therein through which the reduced threaded portion 28 of the piston rod 27 extends.

Mounted on the sleeve 45 I provide a housing member 48 which at one side includes a cylinder portion 49. One end of the cylinder 49 is open and internally threaded as at 50 to receive a closure plug 51.

Positioned in the cylinder 49 I provide a piston rod 52 which extends out of the cylinder through a suitable packing gland 53 and is provided with a reduced threaded portion 54. Within the cylinder 49 the piston rod 52 has a piston 55 mounted thereon. The piston 55 is preferably constructed the same as the previously described piston 32.

Mounted on the reduced portion 28 of the piston rod 27 I provide a connector member 56 which extends towards the piston rod 52 and has an aperture 57 therein in which the reduced portion 54 of the piston rod 52 is positioned. A nut 58 on the threaded portion 54 secures the connector member 56 to the piston rod 52. A nut 59 on the threaded portion 28 of the piston rod 27 securely clamps the piston rod 27 to the cap member 47 and the connector member 56 to the cap member 47.

Beyond the nut 59 a suitable coupling member 60 connects a flexible conduit 61 to the portion 28 of the piston rod 27.

The housing 48 has a plurality of longitudinally extending, spiral keyways 62 therein the radial limits of which are ninety degrees (see Fig. 6).

The sleeve 45 has a plurality of longitudinally extending spirally arranged sets of keys 63 therein which are positioned in the keyways 62 of the housing 48 (see Fig. 5). For preventing the sleeve 45 from rotating I may provide a plurality of sets of keys 63' which are positioned in keyways 63" in the outer face of the master cylinder 17 (see Figs. 4, 5 and 6A).

From the foregoing it will be apparent that when the piston 32 moves towards the flange 14 it will move the sleeve 45 with it and the keys 63 will move in a straight line thereby causing the housing 48 to rotate upward in a clockwise direction. When the piston 32 and the sleeve 45 move towards the flange 13 the keys 63 cause the housing 48 to rotate downward in an anti-clockwise direction. Furthermore when the piston rod 27 is moved the piston 55 is similarly moved through the medium of the connector member 56. The flange 14 includes an arcuate slot 64 to provide clearance for the piston rod 52 when the housing 48 is rotated.

Opposite the cylinder 49 the housing 48 has a pair of spaced hollow bosses 65 thereon which are externally threaded as at 66. The housing 48 includes a longitudinally extending conduit 67 which opens into each of the hollow bosses 65 and a transversely extending conduit member 68 one end of which communicates with the conduit 67 and the opposite end opens into the cylinder 49 adjacent the end nearest the flange 14 (see Fig. 4).

A frame member which is indicated generally at 70 is mounted on the bosses 65. As shown the frame member 70 includes a pair of spaced cylinders 71 connected adjacent their outer ends by a conduit portion 72 and rib portions 73 and 74. The conduit 72 opens into the interior of both the cylinders 71. Spaced from the ends of the cylinders opposite the conduit 72 each of the cylinders 71 includes an enlarged flange 75 which engages the end of the associated boss 65. The portion of the cylinder between the flange 75 and the adjacent end is positioned in its associated boss 65. A coupling nut 76 engages the flange 75 and the threads 66 of the boss 65 and when tightened securely clamps the associated cylinder 71 and boss 65 together.

One end of a removable conduit member 77 is connected as at 78 to the conduit 72. The opposite end of the conduit 77 is connected as at 79 to the cylinder 49 and communicates with the interior thereof adjacent the end nearest the flange 13.

Positioned in each of the cylinders 71 I provide a piston rod 80 each of which extends out of its associated cylinder through a suitable packing gland 81. Within the cylinders each of the piston rods 80 has a piston 82 thereon. The outer ends of the piston rods 80 each includes a reduced threaded portion 83 and mounted on the outer ends of the piston rods I provide a cross head 84 which is secured to the piston rods by nuts 85 on the threaded portions 83.

Intermediate the piston rods 80 the cross head 84 includes an upwardly extending socket portion 86 in which as shown in Fig. 1 the trunnion 87 of a machine gun assembly 88 is positioned and secured thereto in the usual manner.

From the foregoing it will be apparent that when the cylinders 17, 49 and 71 are filled with oil or other suitable fluid on both sides of the pistons therein and the piston 55 is moved towards the flange 14 the piston 55 will force oil through the conduits 68 and 67 into the cylinders 71 thereby forcing the pistons 82 and the piston rods 80 outward.

Thus as the housing 48 rotates upward in a clockwise direction as previously described the cross head 84 and the gun 88 thereon is moved upward and outward. When the piston 55 is moved towards the flange 13 as previously described the piston 55 forces oil through the conduits 77 and 72 into the cylinders 71 thereby forcing the pistons 82 and the piston rods 80 inward. Thus as the housing 48 rotates downward in an anti-clockwise direction as previously described the cross head 84 and the gun 88 thereon are moved downward and inward.

As shown in Figs. 1 and 2 the base 12 of the device 10 is adapted to be mounted on a ring member 90 which surrounds a gunner's cockpit 91 in the fuselage of an airplane. As shown the ring 90 is preferably supported on anti-friction bearings 93 which in turn are supported on a base ring 94 which is mounted on a portion 95 of the fuselage structure. A gunner's seat 96 is hung within the cockpit by metal straps 97 secured to the ring 90.

Below the gunner's seat 96 I show my novel swivel connector member which is indicated generally at 100 and shown in detail in Fig. 7. As shown the connector member 100 includes a cylindrical base member 101 having a bottom wall 102 which is secured to the floor structure 103 of the cockpit by nuts and bolts 104. The base 101 has a chamber 105 therein and a reduced bore 106 the lower end of which opens into the chamber 105 and the upper end into an enlarged recess 107. Adjacent the upper end the base 101 includes an externally threaded portion 108.

Positioned in the bore 106 I provide a sleeve member 109 having an enlarged flange 110 thereon. At the upper end the sleeve 109 includes an externally threaded portion 112. The sleeve 109 further includes a downwardly opening recess 113 and a reduced bore 114 the lower end of which opens into the recess 113 and the upper end opens into an enlarged recess 115. Intermediate the flange 110 and the threads 112 the sleeve 109 includes a lateral externally threaded conduit portion 116.

The sleeve member 109 is positioned in the base 101 with the sleeve flange 110 in the recess 107 and the portion therebelow positioned in the bore 106. Below the sleeve flange 110 I provide an anti-friction bearing member 117 positioned on a packing ring 118 which in turn rests on a suitable packing material 119 surrounding the sleeve. Above the sleeve flange 110 I provide an anti-friction bearing 120. Surrounding the sleeve 109 above the bearing 120 I provide an internally threaded cap member 121 which engages the threads 108 of the base 101. The cap 121 engages the bearing 120 and is adapted to be tightened on the base 101 until the packing 119 is compressed sufficiently to provide a fluid tight seal around the sleeve 109. The cap 121 is adapted to be locked in an adjusted position by a lock nut 122 on the threaded portion 108.

Coaxial with the bore 106 the base includes a column 123 having a lower chamber 124 therein. Adjacent the upper end the column 123 has a reduced bore 125 therein the lower end of which opens into the chamber 124 and the upper end opens into an enlarged recess 126. Positioned in the bore 125 I provide a hollow conduit member 127 which includes an externally threaded upper portion 128 and slightly below the threads 128 the conduit 127 is grooved as at 129 to form opposed flat faces 130 (see Fig. 8).

Intermediate the groove 129 and its lower end the conduit member 127 includes an enlarged flange portion 131 which is positioned within the recess 126 of the column 123. Below the flange 131 I provide an anti-friction bearing member 132 positioned on a packing ring 133 which in turn rests on a suitable packing material 134 surrounding the conduit member 127. Above the flange 131 I provide an anti-friction bearing member 135. Surrounding the conduit 127 above the bearing 135 I provide an internally threaded cap member 136 which engages a threaded portion 137 of the column 123. The cap 136 engages the bearing 135 and is adapted to be tightened on the column 123 until the packing 134 is compressed sufficiently to provide a fluid tight seal around the conduit member 127. The cap 136 is adapted to be locked in an adjusted position by a lock nut 138 on the threaded portion 137.

The base 101 includes a downwardly extending externally threaded intake conduit 139 which communicates with the chamber 124 of the column 123 and a downwardly extending externally threaded return conduit 140 which communicates with the chamber 105.

Intermediate the cap 121 and the conduit 116 a ring member 141 is clamped to the sleeve 109 by means of nuts and bolts 142. As shown a portion of the ring member 141 includes an upwardly extending leg portion 143 the upper end of which is adapted to be secured to the seat 96 in any desired manner as shown in Fig. 1. Adjacent the cap 136 the leg 143 includes a lateral arm 144 the outer portion of which is recessed as at 145 to form prongs 146 (see Fig. 8). The prongs 146 are positioned in the groove 129 of the conduit member 127 and the inner faces thereof engage the flat faces 130 of the groove. Thus it will be seen that when the gun mount supporting ring 90 and the seat 96 rotate the sleeve member 109 and the conduit member 127 will be rotated therewith through the medium of the leg 143.

One end of a pressure supply conduit 147 is connected to the conduit 139 by a suitable coupling member 148 and the opposite end communicates with the standard high pressure oil supply line of the airplane.

One end of a return conduit 149 is connected to the conduit 140 by a suitable coupling member 150 and the opposite end communicates with the standard oil return line of the airplane.

Mounted on one of the seat straps 97 I provide a control valve which is indicated generally at 151 and shown in detail in Figs. 9 and 10. The control valve 151 includes a body portion 152 having legs 153 thereon which are secured to one of the seat straps 97 by nuts and bolts 154.

The body has a tapered recess 155 therein in which a tapered plug valve 156 is positioned and the plug valve 156 includes a stem 157 which projects out of the body 152 through an aperture 158 and has an operating handle 159 thereon. The housing 152 includes a depending externally threaded inlet conduit 160 and thereabove an upwardly extending externally threaded outlet conduit 161. At right angles to the conduits 160 and 161 the body at one side includes an externally threaded conduit 163 and opposite the conduit 163 an externally threaded conduit 164.

The plug valve 156 has a conduit 156' and a conduit 156" therein. The opposite ends of the conduits 156' and 156" are arranged at right angles to each other so that in one position of the plug valve the conduit 156' communicates with the inlet conduit 160 and the conduit 164 and the conduit 163 (see Fig. 10). In another position of the plug valve 156 the conduit 156' communicates with the inlet conduit 160 and the conduit 163 and the plug valve conduit 156" communicates with the outlet conduit 161 and the conduit 164 (see Fig. 11). When the plug valve 156 is in a closed position as shown in Fig. 12 the plug valve conduits 156' and 156" do not communicate with any of the housing conduits 160, 161, 163 or 164.

The conduit 23 from the device 10 is connected to the valve conduit 163 by a suitable coupling member 165. The flexible tubing 61 of the device 10 is connected by a suitable coupling member 166 (see Fig. 2) to one end of a conduit 167 the opposite end of which is connected by a suitable coupling member 168 to the conduit 164 of the control valve 151.

One end of a conduit 169 is connected by a suitable coupling member 170 to the inlet conduit 160 of the control valve 151 and the opposite end of the conduit 169 is connected by a suitable coupling member 171 to the outlet conduit member 127 of the device 100. One end of a conduit 172 is connected by a coupling member 173 to the conduit 116 of the device 100 and the opposite end of the conduit 172 is connected by a coupling member 174 to the outlet conduit 161 of the control valve 151.

In operation oil under pressure from the main pressure line of the airplane flows through the conduit 147 into the chamber 124 of the device 100 and flows therefrom through the conduit member 127 and the conduit 169 to the inlet conduit 160 of the control valve 151.

When the operator desires to elevate the machine gun assembly 88 he rotates the plug valve 156 so that the plug valve conduit 156' affords communication between the inlet conduit 160 and the conduit 163 as shown in Fig. 11 whereupon oil under pressure flows through the conduit 23 into the cylinder 17 thereby forcing the piston 32 and the piston rod 27 outward whereupon the gun assembly is swung upward and outward as previously described. When the gun assembly 88 reaches the desired position the operator rotates the plug valve 156 to a closed position as shown in Fig. 12.

When the operator desires to lower the machine gun assembly 88 he rotates the plug valve 156 to the position shown in Fig. 11 wherein the plug valve conduit 156' affords communication between the inlet conduit 160 and the conduit 164 whereupon oil under pressure flows through the conduit 167 and the flexible conduit 61 into the cylinder 17 thereby forcing the piston 32 and the piston rod 27 to a retracted position whereupon the gun assembly is swung downward and inward as previously described.

When fluid is forced into the cylinder through the conduit 23 the oil in the cylinder on the opposite side of the piston 32 flows therefrom through the flexible conduit 61 and the conduit 167 into the valve 151 and through the plug valve conduit 156" into the conduit 172. Through the conduit 172 into the chamber 105 of the device 100 and thence through the conduit 149 to the main oil return line of the airplane. Likewise when oil is forced into the cylinder 17 through conduits 61 and 167 the oil in the cylinder on the opposite side of the piston 23 flows therefrom through the conduit 23 into the valve 151 and through the plug valve conduit 156" into the conduit 172 and thence into the chamber 105 of the device 100.

By having the seat 96 and the gun mount ring 90 connected the operator can swing himself and the ring 90 by pushing one away or the other with his feet thereby leaving both hands free, one hand to operate the control valve 151 and the other to tilt and fire the gun.

With the device 10 the machine gun assembly can be swung from a horizontal position as shown in Fig. 1 to a straight vertical position as shown by the broken line position indicated at A or to any intermediate position as indicated at B. To shoot downward the machine gun assembly 88 is tilted downward about its standard transverse pivot as shown by the dotted line position indicated at C.

From the foregoing description it will be apparent that I have invented a novel hydraulic swivel connector member which is simple in construction and operation and which is highly efficient for the intended purpose.

Having thus described my invention I claim:

1. In a pressure hydraulic swivel connector, a fixed base having an upwardly extending cylinder thereon, a sleeve member in said cylinder, an anti-friction bearing means in said cylinder to support said sleeve member, said sleeve member including a lower portion opening through the lower end thereof into said cylinder, a conduit communicating with the interior of said sleeve, said base including a hollow pillar fixed on the base and disposed in said sleeve member, an outlet member communicating with the interior of said pillar, anti-friction means on said pillar for supporting said outlet member, said base, including an inlet conduit communicating with the interior of said pillar and an outlet conduit communicating with the interior of said cylinder.

2. In a pressure hydraulic swivel connector, a fixed base having a cylinder thereon, said cylinder including an externally threaded portion adjacent the upper end thereof, a sleeve member in said cylinder, a cap member surrounding said sleeve member and engaging said cylinder, said sleeve member including a lower portion opening through the lower end thereof into said cylinder, a conduit communicating with the interior of said sleeve, said base including an integral, hollow pillar fixed thereon and coaxially disposed in said sleeve member, said pillar member having a chamber, said base including an inlet conduit communicating with said pillar chamber and including an outlet conduit communicating with said cylinder.

3. In a dual pressure hydraulic swivel connector, a fixed base portion having an upwardly extending cylinder thereon, said cylinder including an externally threaded portion adjacent the upper end thereof, a sleeve member in said cylinder, an anti-friction bearing means to support said sleeve member, a cap member surrounding said sleeve member and engaging said cylinder, said sleeve member including a chamber opening through the lower end thereof into said cylinder, a conduit communicating with said sleeve chamber, said base portion including an integral, hollow pillar coaxially disposed in said sleeve member, said pillar having a chamber, a hollow outlet member rotatably mounted on said pillar and communicating with the pillar chamber, anti-friction means for supporting said outlet member, said base portion including an inlet conduit communicating with said pillar chamber and an outlet conduit communicating with said cylinder.

4. In a dual pressure hydraulic swivel connector, a fixed base portion having an upwardly extending cylinder thereon, said cylinder having an internal flange, a sleeve member engaging said flange, said sleeve including an enlarged external flange, said flange being positioned in said cylinder, a lower anti-friction bearing supported on said internal flange and supporting said external flange, an upper anti-friction bearing positioned on said external flange, said sleeve including a chamber opening through the lower end thereof into said cylinder and having an internal flange near its upper end, said sleeve member including a conduit communicating with said sleeve chamber, said base portion including a hollow pillar fixed thereon and coaxially disposed in said sleeve and extending through said sleeve flange, said pillar having a chamber therein, said pillar having an internal flange near its upper end, a hollow outlet member having an enlarged flange, said outlet member being positioned in said pillar chamber, anti-friction means supported by said pillar flange and supporting said outlet flange, said base portion including an inlet conduit communicating with said pillar chamber and an outlet conduit communicating with said cylinder.

5. In a dual pressure hydraulic swivel connector, a base portion having an upwardly extending cylinder thereon, said cylinder including an externally threaded portion adjacent the upper end thereof, said cylinder having an internal flange, a sleeve member engaging said flange, said sleeve member including a threaded upper portion and an enlarged external flange, said flange being positioned in said chamber, a lower anti-friction bearing supported on said internal flange and supporting said external flange, an upper anti-friction bearing positioned on said external flange, a cap member surrounding said sleeve member and engaging said cylinder threads, said cap member engaging said upper bearing, said sleeve including a chamber opening through the lower end thereof into said cylinder and having an internal flange near its upper end, said sleeve member including a conduit communicating with said sleeve chamber, said base portion including an integral, hollow pillar coaxially disposed in said sleeve member and extending through said sleeve flange, said pillar including an externally threaded end portion and having a chamber therein, said pillar member having an internal flange near its upper end, a hollow outlet member having an enlarged flange, said outlet member being positioned in said pillar chamber, anti-friction means supported by said pillar flange and supporting said outlet flange, a cap surrounding said outlet member and engaging said sleeve threads, said base portion including an inlet conduit communicating with said pillar chamber and an outlet communicating with said cylinder.

GEORGE E. BARNHART.